Patented Dec. 16, 1952

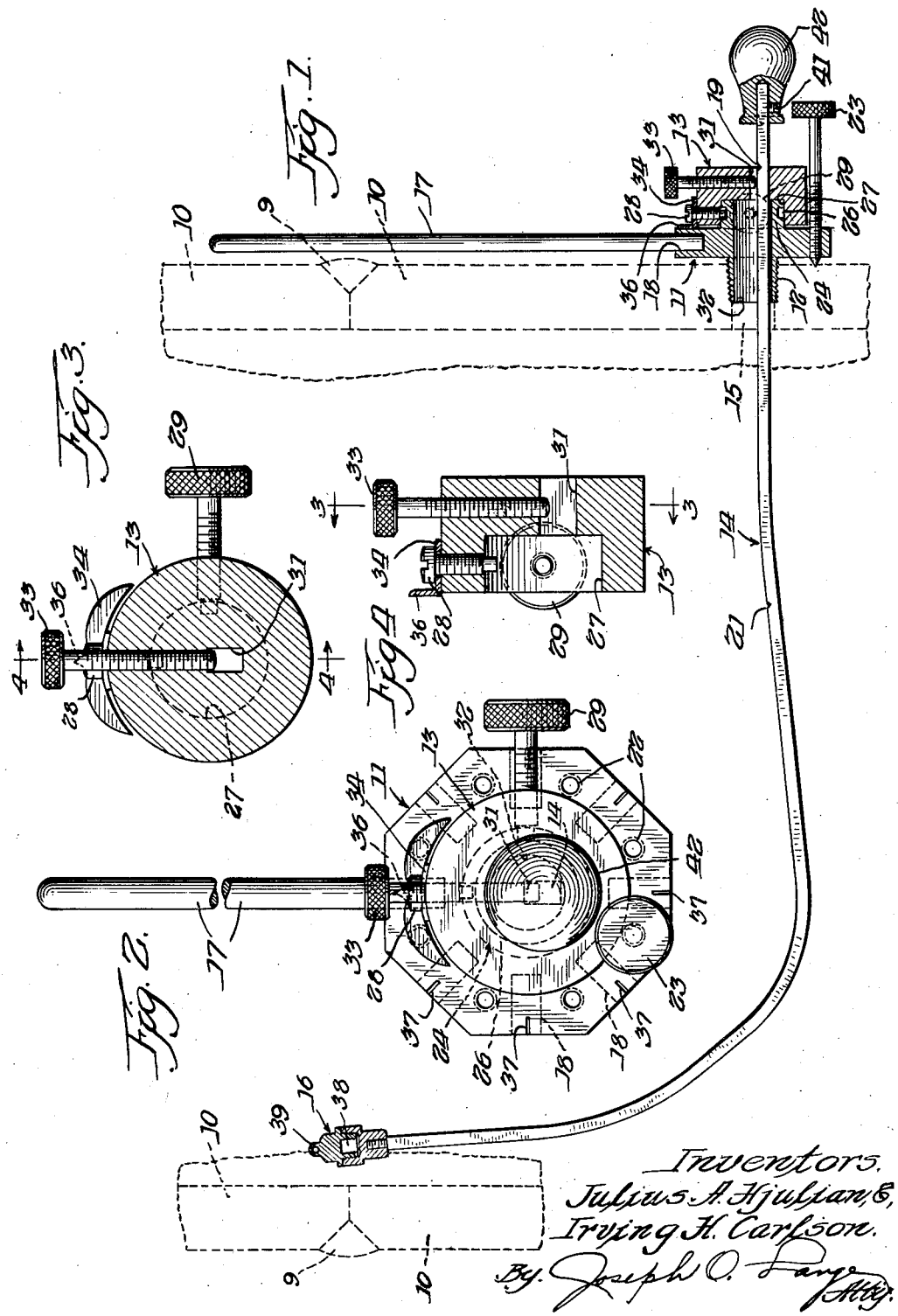

2,622,209

UNITED STATES PATENT OFFICE 2,622,209

RADIOGRAPHIC INSPECTION DEVICE

Julius A. Hjulian, Palos Heights, and Irving H. Carlson, Chicago, Ill., assignors to Crane Co., Chicago, Ill., a corporation of Illinois Application April 26, 1950, Serial No. 158,286

3 Claims. (Cl. 250—91)

This invention pertains to a novel radiographic inspection device used in the survey of normally enclosed structures. The device relates to an article of manufacture useful in the positioning of a radioactive substance employed in the inspection of the aforementioned structures. The inspection of these structures, particularly those of welded joints made in field erection, are frequently made by the use of gamma-rays obtained with radium. Because of the internal contour and space restrictions of such items as pipes, valves, fittings, etc., it is impractical in most cases to place radium on a wire, a carriage, a spider, or the like, as is sometimes done in radiographic examinations of other forms of metallic structures. This invention overcomes the difficulties encountered in the present methods of radiographic inspection; it is especially useful in the inspection of the metallic structure in pipe welds.

An object of this invention is to provide a radioactive substance holding device which may be conveniently employed in the accurate inspection of the structural soundness of a normally enclosed object.

Another object is to provide a device useful in the positioning of a radioactive substance for the survey of pipe welds, or the like, where it is necessary to get the longest focal distance possible for a clear picture.

Other objects and advantages will become more readily apparent upon proceeding with the description read in light of the accompanying drawings, in which:

Fig. 1 is a sectional assembly view of a preferred embodiment of this invention related to a pipe.

Fig. 2 is a front view of the device shown in Fig. 1.

Figs. 3 and 4 are sectional detailed side and front views, respectively, of a locking device used as shown in the assembly in Fig. 1.

Similar reference numerals refer to similar parts throughout the several views.

A brief and general description of the device and its manner of functioning will first be outlined. Thus, in Fig. 1 in partial section is shown the novel radiographic inspection device forming the subject matter of this invention. It is used as a holder for positioning a radioactive substance inside an enclosed structure to be inspected, such as a pipe 10, as shown in dotted lines. A flat octagonal or otherwise formed fixture, generally designated 11, is provided with a relatively small externally threaded shank 12 projecting from the center of one face of the fixture 11. At the opposite end, the center shank portion 24 on the opposite face of the fixture 11 is formed to receive a cylindrical cap 13 which, as hereinafter will be more readily apparent, is used for the indexing or desired positioning of the device. Openings 32 and 31 extending through the center of the fixture 11 and the cap 13, respectively, register to receive a relatively long predeterminately formed rod 14 of generally J-configuration. It is positioned adjustably through the said openings and has a curved end portion, the tip or inner end portion of which is provided with a suitable container to carry a radioactive substance, such as radium, in a capsule 16. Transversely extending in relation thereto, a removable radially extending straight locating rod 17 is preferably positioned in one of a plurality of holes 18 arranged around the edge of the fixture 11.

The function of this device in the course of making a radiographic inspection of a pipe weld, for example, consists of screwing the threaded shank 12 of the fixture 11 into a selected tapped survey hole 15 located a predetermined distance from a weld 9 of the pipe 10. The weld is to be inspected. By selectively inserting the locating rod 17 into one of a plurality of suitable holes 18 around the edge of the fixture 11, the device may be adjusted to align with the pipe 10 and also indicates its position relative to the inner projecting rod 14.

Thus, with the device mounted on the pipe 10, as illustrated, the formed rod 14 extends within the interior of the said pipe so as to place the radium capsule 16 into the plane of the weld 9. The formed rod 14 is provided with two notches 19 and 21 spaced thereon, so that when one notch 19 is aligned with the top of the fixture cap 13, it will be known that the radium capsule 16 has a slight clearance from the inner periphery of the weld at a point diametrically opposite from the fixture 11 (see Fig. 1). Thus, a radiograph may be taken of a segment of the said weld which subtends approximately a 120 degree angle measured from the radium capsule 16 to the diametrically opposite weld section.

After taking the picture at the first setting as described, the formed rod 14 is axially withdrawn in the fixture 11 until the second notch 21 is aligned with the face of the fixture cap 13. Then, upon suitable rotation of the cap 13 which guides the formed rod 14, the radium capsule 16 may be selectively positioned at a second and/or third position. This re-positioning again places the capsule with relatively slight clearance removed from the inner periphery of the weld 9 as determined by the indexing means referred to, or by touching the weld with the capsule 16 and then slightly backing away from it. Again, a diametrically opposite and approximately 120 degree segment of the weld is radiographed. Thus, it will be apparent that in three settings of the device, the complete circumference of the weld is radiographed, while a long focal distance from the radium to the section being examined is maintained.

It should here be noted that the formed rod 14 is slightly curved predeterminately in a manner to place the capsule 16 beyond the plane of the weld 9 in withdrawing the rod 14 from the pipe 10 to the second notch 21. Then, in pivoting the formed rod 14 with the fixture cap 13, the capsule 16 is again positioned in the plane of the weld to be radiographically inspected.

With the function and the general structure of the device thus described, details of the structure will hereinafter be given.

The fixture 11 may optionally contain a plurality of tapped holes 22 about its outer section (see Fig. 2) to receive a fixture locking screw 23 (see Fig. 1), applied in securing the fixture 11 firmly to the pipe 10. The face of the fixture 11 which carries the fixture cap 13 has a cylindrical shank 24 with an annular groove 26 in the outer periphery thereof. The fixture cap 13 contains an annular recess 27 (Fig. 3) to provide for the cap 13 being rotatably mounted over the shank 24, as shown in Fig. 1. A tapped hole in the cap 13 receives a screw 28, the end of which extends to register with the annular groove 26 of the fixture shank 24 to secure the cap 13 to the fixture 11. As shown in Fig. 4, an index lock screw 29 is threadedly engaged through the side of the fixture cap 13 to abut the fixture shank 24, thereby locking these two members after desired rotation of the cap 13.

A rectangular opening 31 through a central portion of the top of the cap 13 registers with an axial opening 32 through the fixture 11, as shown in Fig. 1. The formed rod 14 is preferably of a square or other polygonal cross-sectional shape to allow the rod 14 to fit through the fixture 11 and the cap 13. A cap screw 33 may be transversely threaded through the cap 13 to abut the formed rod 14, thereby conveniently locking the rod 14 in position.

For increased facility of use, it may be desirable to provide an index member, such as that shown in Figs. 3 and 4, in which assembly a right-angle plate member 34 having a pointer 36 is secured to the fixture cap 13 by means of the screw 28. One leg of the index member 34 is parallel to the adjacent side of the fixture 11 which contains radially extending index marks 37 (see Fig. 2) about the outer portion thereof. Thus, it will be apparent that the index member 34 rotates with the cap 13, and allows the cap 13 and fixture 11 to be visually aligned through observance of the position of the index pointer 36 and the index marks 37.

The radioactive substance container capsule 16, which preferably may be made of aluminum or a non-metallic material is threadedly engaged or otherwise attached to the end of the formed rod 14. As shown in Fig. 1, the capsule 16 may have two opposite cylindrical halves which are threaded together to form a closed chamber 38, for holding radium or the like. An end tip of the capsule is provided with an eye 39, through which a string may be threaded to insure recovery of the capsule 16 in the event it becomes disengaged from the rod 14 while within a pipe.

As shown in Fig. 1, the straight end of the formed rod 14 by means of a set screw 41 may be joined with a knob 42 used for greater convenience of hand operation of the rod 14.

Thus, a simple, economical, and efficient means has been provided for effecting the radiographic inspection of pipe welds and the like.

It will be obvious that although the invention has been shown in one preferred form, it is not to be so limited, but it is susceptible to substantial change without departing from the spirit of the invention and the scope of the appended claims.

We claim:

1. A holder device for radiographic inspection of normally enclosed objects such as pipe or the like, the combination comprising a hollow member to be inspected having a survey aperture, a base member having a threaded shank and an opening therethrough, the base member being mounted in a wall of the member to be inspected, a predeterminately formed rod adjustably mounted in the opening of the said base member, and extending into the said hollow member, means on the end of the said rod for carrying a radioactive substance or the like.

2. A holder device for radiographic inspection, comprising a fixture with an externally threaded shank and having an opening therethrough, aligning means on the said fixture for orienting the same upon an object to be inspected, a cap rotatably mounted on the said fixture and having an opening to register with the said fixture opening, means on the said cap for indexing the same with the said fixture, a formed rod and holder, the said rod being adjustably mounted in and extending through the said cap and fixture openings.

3. An inspection device of the character described for use on a hollow object with a survey opening therein, comprising a fixture member having an opening therethrough, a threaded shank on the said fixture member for engaging the said hollow object survey opening, means for locking the said fixture member onto the said hollow object, a cap mounted on the said fixture and having an opening therein to register therewith, an angularly formed rod limitedly rotatably mounted on the said cap and extending through the said cap and fixture opening into the said hollow object, container means for holding an inspection substance onto the end of the said rod extending into the said hollow object, visible means cooperating with the said cap and the said rod for indicating the direction of the said rod within the hollow object.

JULIUS A. HJULIAN.
IRVING H. CARLSON.

REFERENCES CITED

The following references are of record in the file of this patent:

UNITED STATES PATENTS

| Number | Name | Date |
|---|---|---|
| Re. 22,531 | Hare | Aug. 22, 1944 |
| 1,597,504 | Barr | Aug. 24, 1926 |
| 2,269,458 | Kahn | Jan. 13, 1942 |
| 2,315,819 | Schlesman | Apr. 6, 1943 |
| 2,412,174 | Rhoades | Dec. 3, 1946 |
| 2,494,740 | Boucher | Jan. 17, 1950 |